US012602810B2

(12) United States Patent
Lin et al.

(10) Patent No.: US 12,602,810 B2
(45) Date of Patent: Apr. 14, 2026

(54) TIRE-SIZE IDENTIFICATION METHOD, TIRE-SIZE IDENTIFICATION SYSTEM AND COMPUTER-READABLE STORAGE MEDIUM

(71) Applicant: Wistron Corp., New Taipei City (TW)

(72) Inventors: Zhe-Yu Lin, New Taipei City (TW); Chih-Yi Chien, New Taipei City (TW)

(73) Assignee: Wistron Corp., New Taipei City (TW)

( * ) Notice: Subject to any disclaimer, the term of this patent is extended or adjusted under 35 U.S.C. 154(b) by 373 days.

(21) Appl. No.: 18/193,531

(22) Filed: Mar. 30, 2023

(65) Prior Publication Data

US 2024/0185444 A1      Jun. 6, 2024

(30) Foreign Application Priority Data

Dec. 6, 2022      (TW) .................................. 111146693

(51) Int. Cl.
*G06T 7/62*                (2017.01)
(52) U.S. Cl.
CPC ...... *G06T 7/62* (2017.01); *G06T 2207/10016* (2013.01); *G06T 2207/20076* (2013.01); *G06T 2207/30242* (2013.01)

(58) Field of Classification Search
None
See application file for complete search history.

(56) References Cited

U.S. PATENT DOCUMENTS

2020/0340885 A1* 10/2020 Held ................... G01M 17/021

FOREIGN PATENT DOCUMENTS

CN          1566903 A          1/2005
DE     202019104565 U1 * 10/2019  ......... G01M 17/021
KR         920010014 B1 * 11/1992

* cited by examiner

*Primary Examiner* — Vikkram Bali

(57) ABSTRACT

A tire-size identification method includes the following steps. An object-detection model frames a tire image in an image to generate a framed tire image. The framed tire image is input into an image-segmentation model. The image-segmentation model outputs the tire inner diameter of the tire. Moreover, the tire inner diameter is input into a classification model. The classification model outputs the tire size.

17 Claims, 6 Drawing Sheets

<u>200</u>

100

200

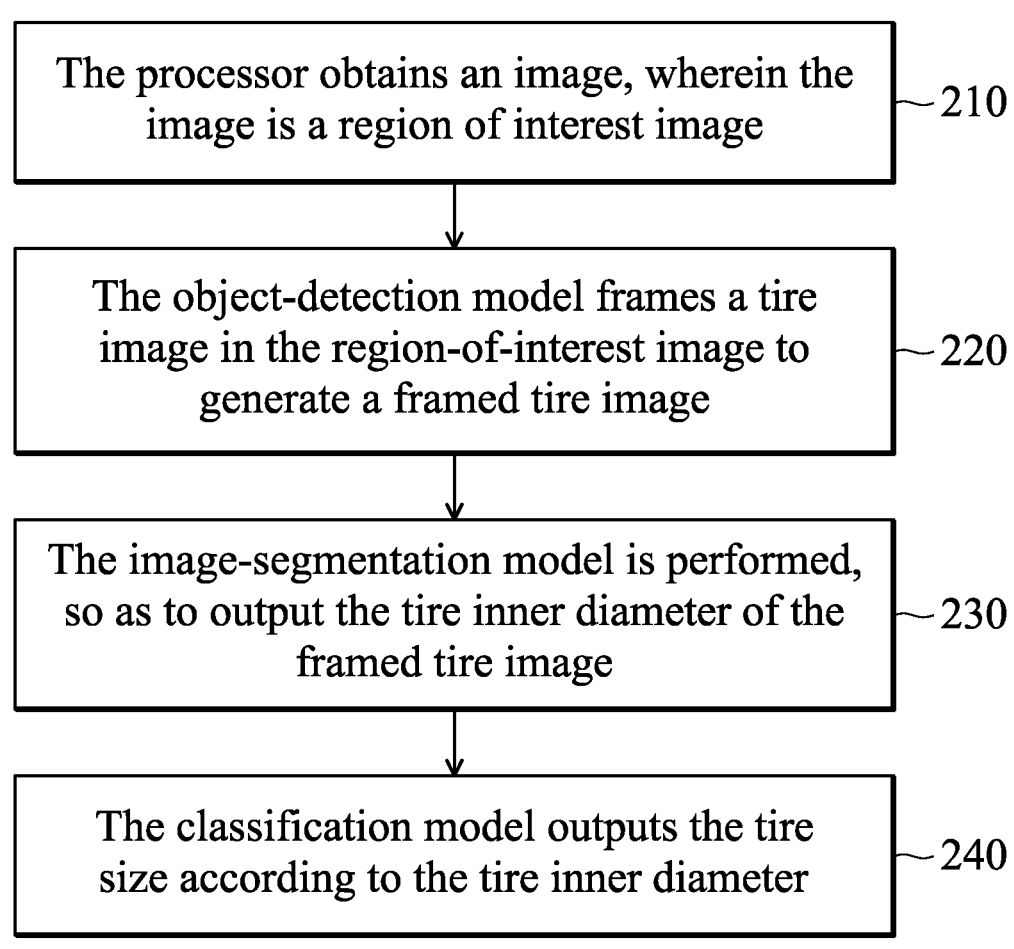

The processor obtains an image, wherein the image is a region of interest image ~210

The object-detection model frames a tire image in the region-of-interest image to generate a framed tire image ~220

The image-segmentation model is performed, so as to output the tire inner diameter of the framed tire image ~230

The classification model outputs the tire size according to the tire inner diameter ~240

FIG. 2

IMG0

30

ROIt0

B1

B2

B4

B3

ROIt0

TIRE-SIZE IDENTIFICATION METHOD, TIRE-SIZE IDENTIFICATION SYSTEM AND COMPUTER-READABLE STORAGE MEDIUM

CROSS REFERENCE TO RELATED APPLICATIONS

This application claims priority of Taiwan Patent Application No. 111146693, filed on Dec. 6, 2022, the entirety of which is incorporated by reference herein.

BACKGROUND OF THE INVENTION

Field of the Invention

An embodiment of the present invention relates to a size identification method, and in particular it relates to a tire-size identification method, a tire-size identification system and a computer-readable storage medium applied to calculate a tire.

Description of the Related Art

When waste tire recycling plants recycle tires, income is calculated according to the size of each waste tire. However, in order to streamline the operation of waste tire recycling plants, the method for estimating the size of tires is to chop a large number of tires and then calculate the size of each tire according to the weight of the tire fragments. Such an estimation method is very inaccurate and has a large margin of error, which is reflected in lost potential revenue.

Therefore, how to more accurately identify the size of each tire on a conveyor belt before the tire is chopped up, and thereby reduce errors and loss of income, has become one of the important problems to be solved.

BRIEF SUMMARY OF THE INVENTION

An embodiment of the present invention provides a tire-size identification method, which include the following steps. An image is input into an object-detection model, wherein the object-detection model frames a tire image in the image to generate a framed tire image. The framed tire image is input into an image-segmentation model, wherein the image-segmentation model outputs the tire inner diameter of the framed tire image. The tire inner diameter is input into a classification model, wherein the classification model outputs the tire size according to the tire inner diameter.

In an embodiment, a processor is used to calculate the distance between the framed tire image in the image and the framed tire image in the next frame image, and to compare the framed tire image in the image and the framed tire image in the next frame image with the shortest distance between the image and the next frame image, so as to track the position of the framed tire image.

In an embodiment, the processor is used to find the maximum value of the tire inner diameter from the original video. A storage device is used to record the maximum value of the tire inner diameter in the original video. The original video includes the image and the next frame image.

In an embodiment, the original video includes the region-of-interest image and another region-of-interest image.

In an embodiment, after inputting the inner diameter pixel value of the tire inner diameter into the classification model, the classification model outputs the probability corresponding to each of a plurality of candidate tire-size categories, and uses a tire-size category corresponding to a highest probability of the probabilities as the tire size.

In an embodiment, obtained information about the tire size is superimposed on the original video, and a video superimposed with information about the tire size is transmitted to the display device for display.

In an embodiment, tire-size identification method further includes obtaining the image, wherein the image is a region-of-interest image.

An embodiment of the present invention provides a tire-size identification system. The tire-size identification system includes a processor and a storage device. The processor accesses a program stored in the storage device to implement an object-detection model, an image-segmentation model and a classification model. The object-detection model frames a tire image in an image to generate a framed tire image. The image-segmentation model outputs the tire inner diameter of the framed tire image. The classification model outputs the tire size according to the tire inner diameter.

In an embodiment, the processor calculates the distance between the framed tire image in the image and the framed tire image in the next frame image, and compares the framed tire image in the image and the framed tire image in the next frame image with the shortest distance between the image and the next frame image, so as to track the position of the framed tire image.

In an embodiment, the processor finds the maximum value of the tire inner diameter from the original video, and the storage device records the maximum value of the tire inner diameter in the original video, wherein the original video comprises the image and the next frame image.

In an embodiment, the processor counts tires with the same tire size according to the tire size of each tire.

In an embodiment, after the processor inputs the inner diameter pixel value of the tire inner diameter into the classification model, the classification model outputs probability corresponding to each of a plurality of candidate tire-size categories, and uses a tire-size category corresponding to a highest probability of the probabilities as the tire size.

In an embodiment, the processor superimposes obtained information about the tire size on the original video, and transmits a video superimposed with information about the tire size to the display device for display.

In an embodiment, the processor further obtains the image, wherein the image is a region-of-interest image.

An embodiment of the present invention provides a computer-readable storage medium that stores one or more programs including instructions, and when the instructions are executed by a processor, the processor is caused to perform steps. An image is input into an object-detection model, wherein the object-detection model frames a tire image in the image to generate a framed tire image. The framed tire image is input into an image-segmentation model, wherein the image-segmentation model outputs the tire inner diameter of the framed tire image. The tire inner diameter is input into a classification model, wherein the classification model outputs the tire size according to the tire inner diameter.

In an embodiment, when the instructions are executed by the processor, the processor is caused to further perform steps. The distance between the framed tire image in the image and the framed tire image in the next frame image is calculated, the framed tire image in the image and the framed tire image in the next frame image with the shortest distance between the image and the next frame image is compared, so as to track the position of the framed tire image.

In an embodiment, when the instructions are executed by the processor, the processor is caused to further perform steps. The maximum value of the tire inner diameter is found using the original video. The maximum value of the tire inner diameter in the original video is recorded. The original video includes the image and the next frame image.

In an embodiment, when the instructions are executed by the processor, the processor is caused to further perform steps. Tires with the same tire size are counted according to the tire size of each tire.

In an embodiment, when the instructions are executed by the processor, the processor is caused to further perform steps. After inputting the inner diameter pixel value of the tire inner diameter into the classification model, the classification model outputs the probability corresponding to each of a plurality of candidate tire-size categories, and uses that the tire size is that of the tire-size category with the highest probability.

In an embodiment, when the instructions are executed by the processor, the processor is caused to further perform steps. Obtained information about the tire size is superimposed on the original video, and a video superimposed with information about the tire size is transmitted to the display device for display.

In summary, the tire-size identification method, the tire-size identification system and the computer-readable storage medium use the object-detection model, the image-segmentation model and the classification model to frame-select the region-of-interest image and find the largest diameter in the tire inner diameter, and the size of the tire may be classified through the classification model according to the tire inner diameter, thereby achieving a more accurate effect of detecting the tire inner diameter.

BRIEF DESCRIPTION OF THE DRAWINGS

The present invention can be more fully understood by reading the subsequent detailed description and examples with references made to the accompanying drawings, wherein:

FIG. 2 is a flowchart of a tire-size identification method according to an embodiment of the present invention;

DETAILED DESCRIPTION OF THE INVENTION

The following description is of the contemplated mode of carrying out the present invention. This description is made for the purpose of illustrating the general principles of the present invention and should not be taken in a limiting sense. The scope of the present invention is determined by reference to the appended claims.

The present invention will be described with respect to particular embodiments and with reference to certain drawings, but the present invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim component does not by itself connote any priority, precedence, or order of one claim component over another or the temporal order in which acts of a method are performed, but are used merely as labels to distinguish one claim component having a certain name from another component having the same name (but for use of the ordinal term) to distinguish the claim components.

Figure 1:
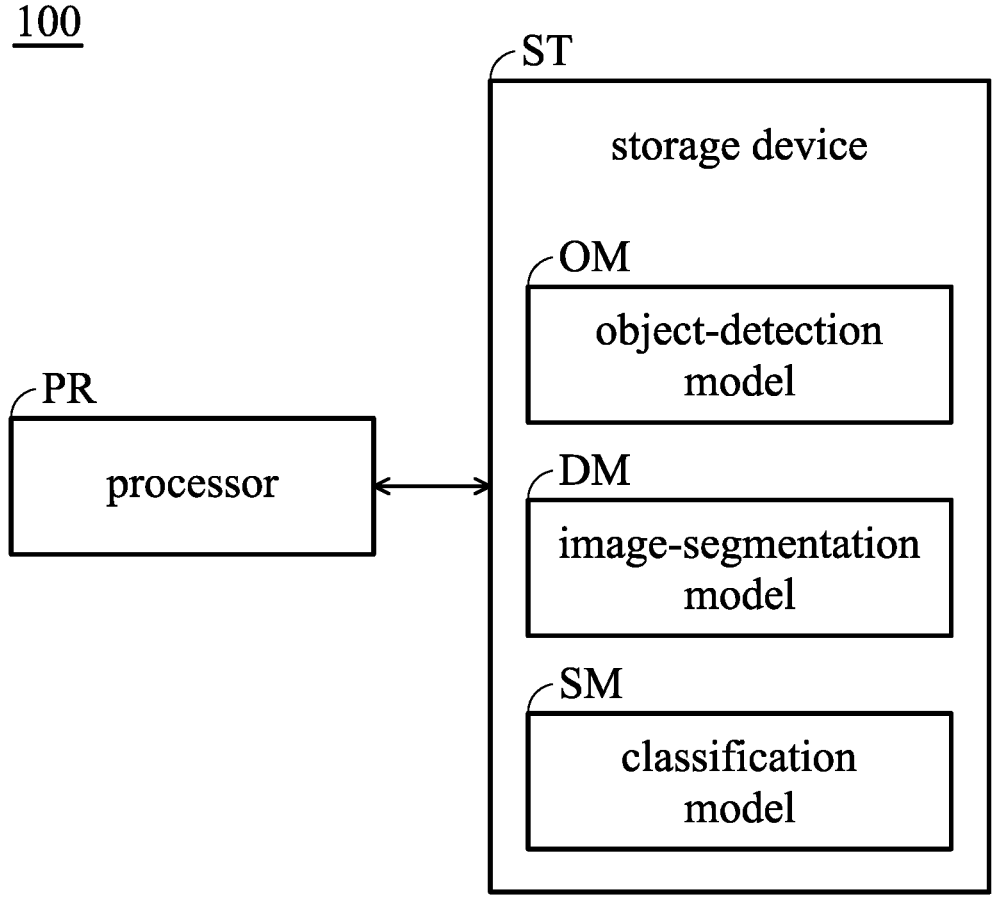
FIG. 1 is a block diagram of a tire-size identification system according to an embodiment of the present invention.

Please refer to FIGS. 1 and 2. FIG. 1 is a block diagram of a tire-size identification system 100 according to an embodiment of the present invention. FIG. 2 is a flowchart of a tire-size identification method 200 according to an embodiment of the present invention. In an embodiment, the tire-size identification method 200 may be implemented by the tire-size identification system 100.

In an embodiment, as shown in FIG. 1, the tire-size identification system 100 includes a processor PR and a storage device ST. In an embodiment, the tire-size identification system 100 may be a server, a laptop, a desktop computer, a smart camera, a smart monitor, a smart monitoring device, or an electronic device with computing and storage functions.

In an embodiment, the processor PR is coupled to the storage device ST, and the processor PR is configured to access a program stored in the storage device ST, to implement an object-detection model OM, an image-segmentation model DM and a classification model SM.

In an embodiment, the processor PR may be implemented by an integrated circuit, such as a micro controller, a microprocessor, a digital signal processor (DSP), a field programmable gate array (FPGA), an application specific integrated circuit (ASIC) or a logic circuit.

In an embodiment, the storage device ST may be implemented as ROM, flash memory, floppy disk, hard disk, optical disk, pen drive, magnetic tape, a database accessible over a network, or those skilled in the art may easily conceive of having the same function the storage medium.

In an embodiment, the object-detection model OM, the image-segmentation model DM and the classification model SM may be implemented by software.

In an embodiment, the object-detection model OM, the image-segmentation model DM and the classification model SM may be implemented by hardware circuits or chips with specific functions that are independent of the storage device ST.

Figure 3:
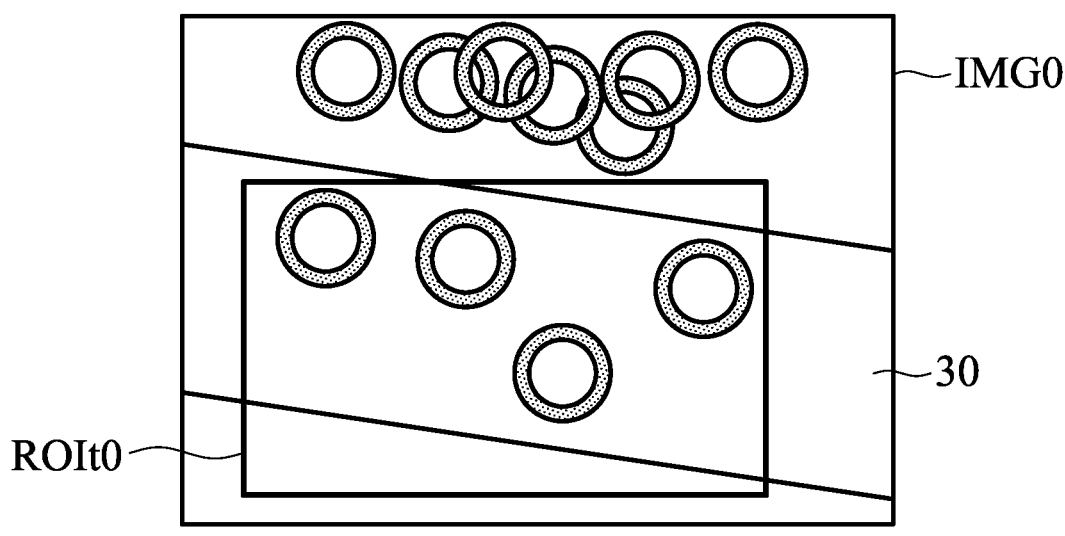
FIG. 3 is a schematic view of a region-of-interest image according to an embodiment of the present invention.

The following describes the implementation steps of the tire-size identification 200. In an embodiment, please refer to FIG. 3. FIG. 3 is a schematic view of a region of interest (ROI) image according to an embodiment of the present invention.

In step 210, the processor PR obtains an image, wherein the image may be a region of interest (ROI) image (such as the region-of-interest image ROIt0).

In an embodiment, the processor PR obtains the region-of-interest image through a position defined in advance by the user. In an embodiment, the position information of the region of interest (such as multiple sets of coordinate information) is stored in the storage device ST in advance. After the processor PR obtains the image, the processor PR accesses the position information of the region of interest in the storage device ST, so as to obtain the region-of-interest image. In other embodiments, the image is stored in the storage device ST, and the processor PR accesses the image and the position information of the region of interest in the storage device ST, so as to obtain the region-of-interest image.

In step 220, the object-detection model OM frames a tire image in the region-of-interest image ROIt0 to generate a framed tire image.

In an embodiment, a camera may be used to capture the initial image IMG0, and the processor PR may receive the initial image IMG0 from the camera. In the embodiment, the initial image IMG0 includes a conveyor belt 30 and a plurality of tires (represented by circles). The trained object-detection model OM detects a position of each of the tires for the region-of-interest image ROIt0.

Since the object-detection model OM does not need to detect the entire initial image IMG0, the amount of computation may be reduced. In other embodiments, the initial image captured by the camera is only the image of the conveyor belt 30. In this case, the processor PR may omit step 210 and use the initial image to perform step 220, and the object-detection model OM frames the tire image in the initial image, so as to generate framed tire image. In another embodiment, if the processor PR has enough computation, the processor may omit step 210 and use the initial image to perform step 220, and the object-detection model OM detects the entire initial image IMG0, so as to generate the framed tire image.

Figure 4:
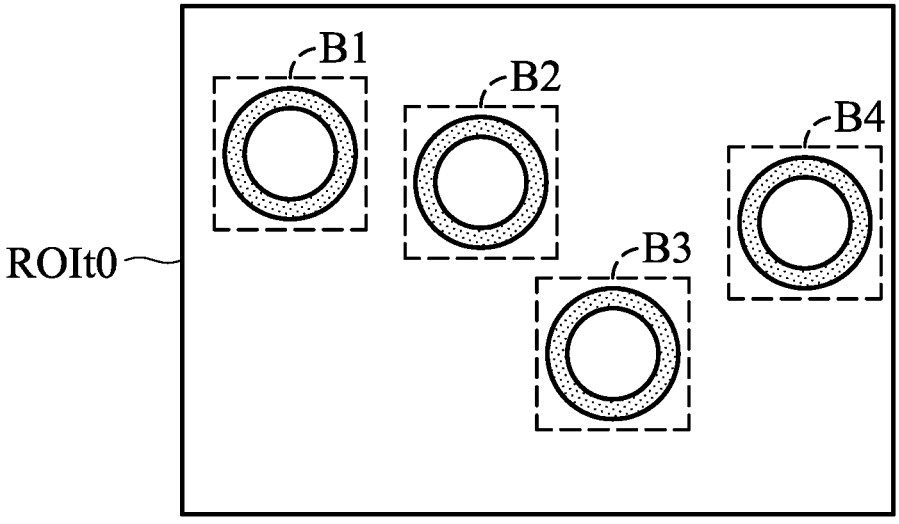
FIG. 4 is a schematic view of a framed tire image according to an embodiment of the present invention.

Please refer to FIG. 4. FIG. 4 is a schematic view of a framed tire image according to an embodiment of the present invention. In an embodiment, the object-detection model OM detects the position of each of the tires for the region-of-interest image ROIt0, and frames the position of each of the tires, as shown in the framed tire images B1~B4. It can be seen from FIG. 4 that the framed positions of the framed tire images B1~B4 are related to the tire outer diameter.

In an embodiment, the input of the object-detection model OM during training is a plurality of image of marked tires, and the goal during training is to output the coordinate position of the tire on the image (for example, the output parameters includes the X-axis position, the Y-axis position, the length, the width, etc. of the framed tire image).

In an embodiment, the object-detection model OM may use models, such as Yolo, region-based convolutional neural networks (R-CNN), single shot multibox detector (SSD), etc., but the embodiment of the present invention is not limited thereto. Any model or method that may detect a specific object from the image may be used.

In step 230, the image-segmentation model DM is performed, so as to output the tire inner diameter of the framed tire image.

In an embodiment, since the size measurement of the tire is based on the inner diameter of the tire as the measurement standard, the length or width of the framed tire images B1~B4 of step 220 may not be used as the basis for judging the tire size. Here, the image-segmentation model DM is used to find the range of the tire inner circle (the tire inner diameter) of the tire, and the length of the tire inner circle is used as the basis for judging the tire size. In an embodiment, after the image-segmentation model DM find the range of the inner circle of the tire, the image-segmentation model DM calculate the longest pixel length of the inner circle as the basis for judging the tire size, wherein the range of the inner circle of the tire may be circular or elliptical, and the longest pixel length may the diameter or long axis of the range of the inner circle.

In an embodiment, the input of the image-segmentation model DM during training is a plurality of images of the range of marked tire, and the goal of the image-segmentation model DM during training process is to output the category set of each of the pixels, identify the range of the tire in each of the images, and obtain the range of inner circle of the tire. For example, the image-segmentation model DM judges whether each pixel is the range of the tire. If the image-segmentation model DM judges that the pixel is not the range of the tire, the image-segmentation model DM generates the judging result of the pixel as "0". If the image-segmentation model DM judges that the pixel is the range of the tire, the image-segmentation model DM generates the judging result of the pixel as "1". Then, the image-segmentation model DM output the judging result of each pixel, and forms the judgment results into a matrix corresponding to the image. In this matrix, the pixels whose judging result is "1" are the range of the tire, and the pixels surrounded by the range of the tire and whose judging result is "0" are the range of the inner circle of the tire. Afterward, the image-segmentation model DM finds two pixel positions with a farthest distance in the range of the inner circle, and uses the distance between the two pixel positions as the length of the inner circle.

In an embodiment, the image-segmentation model DM may use models, such as Unet, Mask R-CNN, FPN, PSPNet, etc., but the embodiment of the present invention is not limited thereto. Any model or method that may segment a specific object may be used.

Figure 5:
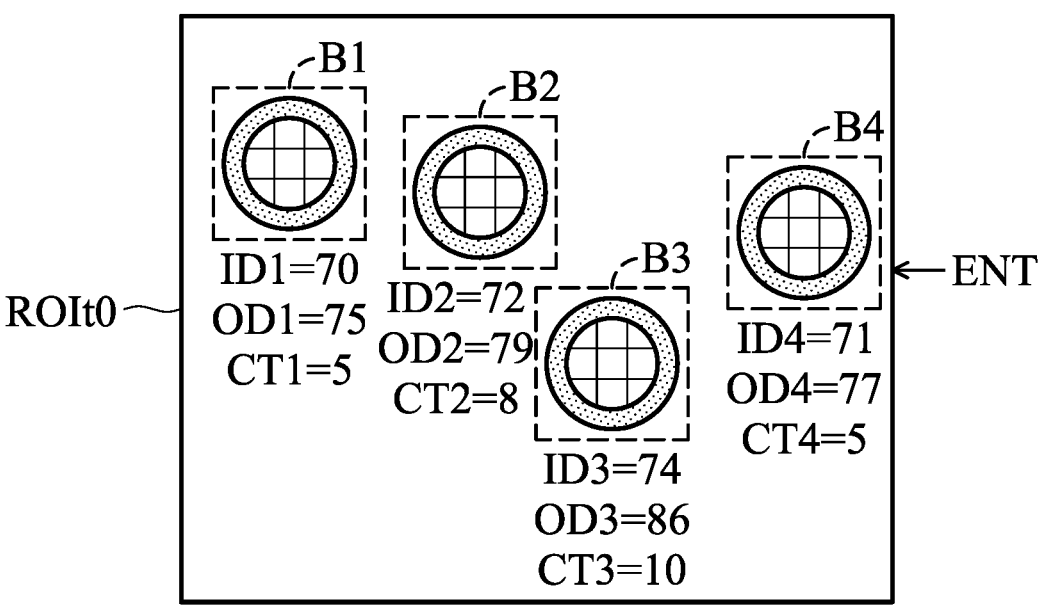
FIG. 5 is a schematic view of a tire size label according to an embodiment of the present invention.

In an embodiment, please refer to FIG. 5. FIG. 5 is a schematic view of a tire size label according to an embodiment of the present invention. The direction ENT in FIG. 5 represents that the conveyor belt 30 is moving to the left. Whenever the tire image of the region-of-interest image ROIt0 enters from the far right, the processor PR may add 1 to the count. After judging the size corresponding to the framed tire image, the processor PR may also accumulate the framed tire images with the same size.

By using the trained image-segmentation model DM, the image-segmentation model DM may obtain the tire inner diameter (the length of the tire inner circle) of each of the framed tire images in the region-of-interest image ROIt0.

As shown in FIG. 5, the tire inner diameter ID1 of the framed tire image B1 is 70 (pixels), the tire outer diameter OD1 is 75, and the current quantity CT1 of the same size is 5.

The tire inner diameter ID2 of the framed tire image B2 is 72, the tire outer diameter OD2 is 79, and the current quantity CT2 of the same size is 8.

The tire inner diameter ID3 of the framed tire image B3 is 74, the tire outer diameter OD3 is 86, and the current quantity CT3 of the same size is 10.

The tire inner diameter ID4 of the framed tire image B4 is 71, the tire outer diameter OD4 is 77, and the current quantity CT4 of the same size is 5.

Figure 6:
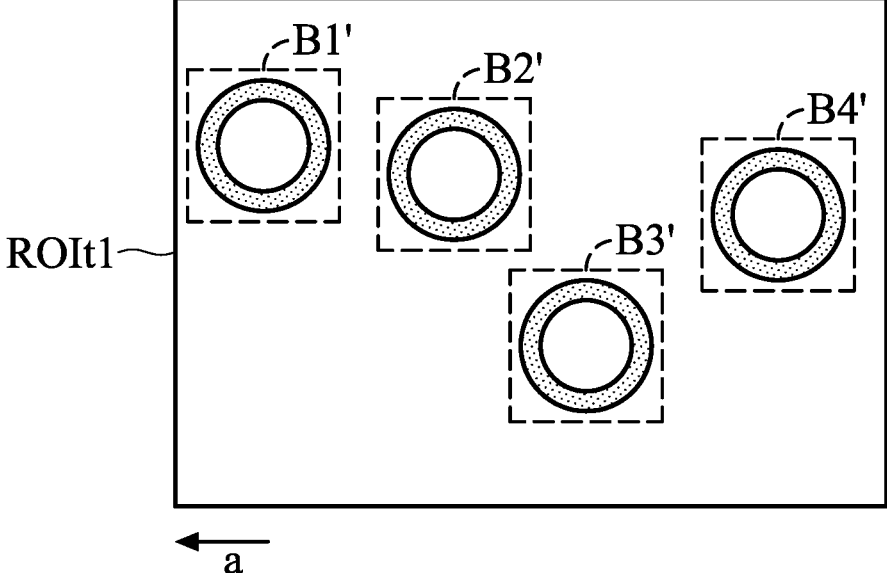
FIG. 6 is a schematic view of tracking a tire image in a video according to an embodiment of the present invention.

Please refer to FIG. 6. FIG. 6 is a schematic view of tracking a tire image in a video according to an embodiment of the present invention. In an embodiment, the processor PR may receive a plurality of original images, such as a video (hereinafter referred to as the original video), and track the same tire image in each adjacent image (through the framed tire image in each adjacent image) of the original video, wherein the processor PR may perform step 210 to step 230 for each of the original images in the original video, so as to obtain the framed tire image of the region-of-interest image and the framed tire image of the another region-of-interest image.

In other words, since the tire may continue to advance in a certain direction (such as direction a) on the conveyor belt, the processor PR must continuously track the position of each tire in the initial video until the tire disappears from the video (or from the region of interest in the video). The principle of this object-tracking algorithm is to detect the framed tire images (such as the framed tire images B1~B4 in the region-of-interest image ROIt0 and the framed tire images B1'~B4' in the region-of-interest image ROIt1) of two consecutive images, calculate the distance between each object image of the first image and each object image of the second image, and respectively find the object image with the smallest distance, then it is regarded as the same object.

In an embodiment, the tracking algorithm may give a temporary label (such as temporary labels A or B) for each of the framed tire images, and record the coordinates of the center point of the tire. When the time point n reaches the time point n+1 (n is a positive integer), the tracking algorithm may calculate the distance between each temporary label coordinate at the time point n and each temporary label coordinate at the time point n+1, and use the group with the smallest distance change as the same object.

In an embodiment, the processor PR calculates the distance between the framed tire image in the region-of-interest image ROIt0 (FIG. 4) and the framed tire image in the another region-of-interest image ROIt1 (FIG. 6), and compares the framed tire image in the image and the framed tire image in the next frame image with a shortest distance between the region-of-interest image ROIt0 (FIG. 4) and the another region-of-interest image ROIt1 (FIG. 6), so as to track the position of the framed tire image. In the embodiment, the another region-of-interest image ROIt1 may be the next frame image of the region-of-interest image ROIt0.

In the example of FIG. 6, since the conveyor belt is transporting the tires in the direction a, the framed tire images B1~B4 in FIG. 4 are respectively shifted to the left to the positions of the framed tire images B1'~B4' in FIG. 6. For example, since the framed tire image B1' in FIG. 6 is the closest to the framed tire image B1 in FIG. 4 is the shortest, the framed tire image B1' and the framed tire image B1 may be regarded as the same tire. Since the framed tire image B2' in FIG. 6 is closest to the framed tire image B2 in FIG. 4, the framed tire image B2' and the framed tire image B2 may be regarded as the same tire. Since the framed tire image B3' in FIG. 6 is the closest to the framed tire image B3 in FIG. 4, the framed tire image B3' and the framed tire image B3 may be regarded as the same tire. Since the framed tire image B4' in FIG. 6 is the closest to the framed tire image B4 in FIG. 4, the framed tire image B4' and the framed tire image B4 may be regarded as the same tire.

Therefore, on the conveyor belt 30, each tire may be tracked through the characteristic that adjacent frames have small shifting amounts at different time points.

In an embodiment, the processor PR uses the storage device ST to record the maximum value of the tire inner diameter in the original video, wherein the original video includes the region-of-interest image ROIt0 and the another region-of-interest image ROIt1 (i.e., the next frame image).

Figure 7:
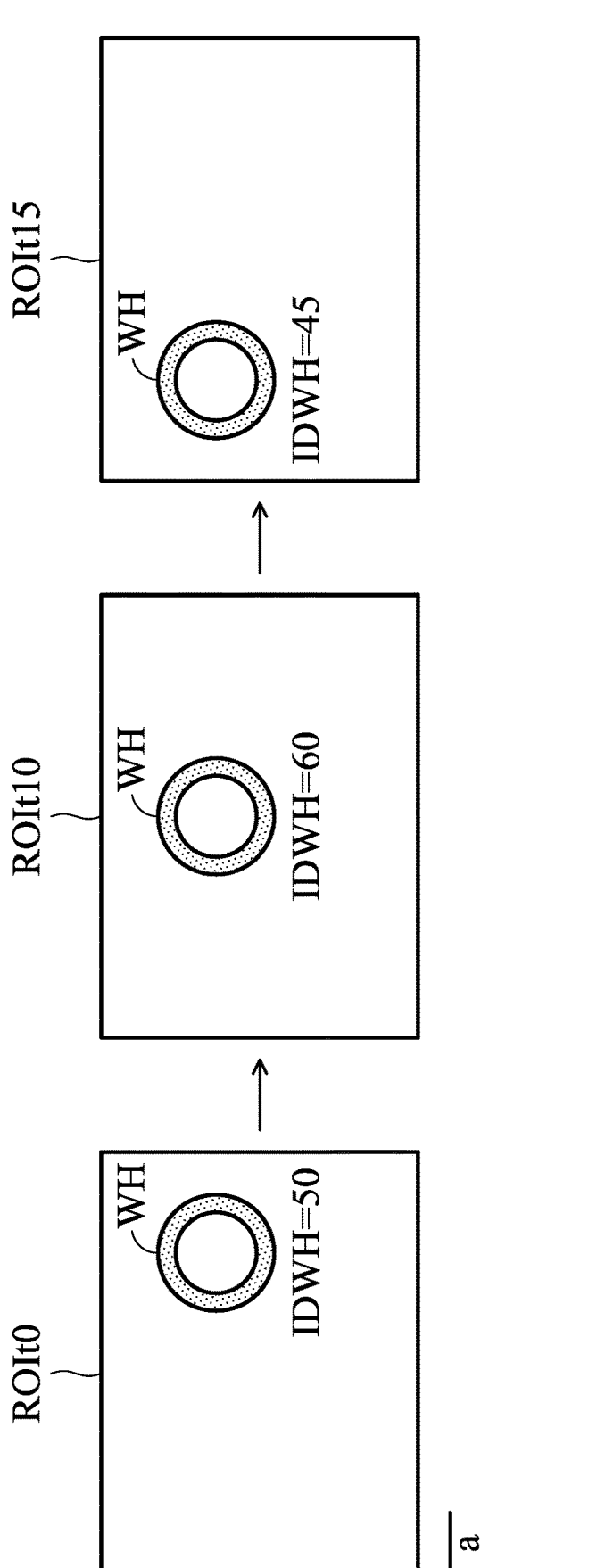
FIG. 7 is a schematic view of recoding a maximum value of a tire inner diameter according to an embodiment of the present invention.

Please refer to FIG. 7. FIG. 7 is a schematic view of recoding a maximum value of a tire inner diameter according to an embodiment of the present invention. The farther the object is from the lens of the camera, the smaller the object on the image will be. Since the tires are located at different positions on the conveyor belt 30 and the distance from the camera is different, the processor PR tracks each tire in each image in the video, records the tire inner diameter in each image and sieves the largest. That is, when the object shows the maximum value in the video, the pixel value of the largest inner diameter of each object may be used as the basis for subsequently judging the size.

In an embodiment, the sequence of images according to the timing is the region-of-interest image ROIt0, the region-of-interest image ROIt10, the region-of-interest image ROIt15. The tire inner diameter IDWH of the tire image WH in the region-of-interest image ROIt0 is 50 (pixels). The tire inner diameter IDWH of the tire image WH in the region-of-interest image ROIt10 is 60. The tire inner diameter IDWH of the tire image WH in the region-of-interest image ROIt15 is 45. It can be seen that since the tire image WH has a maximum value at the time point corresponding to the region-of-interest image ROIt10, it indicates that the tire at this time point is the closet to the camera, the tire inner diameter IDWH of 60 may be regarded as the tire inner diameter of the tire.

In an embodiment, when the processor PR obtains the tire inner diameter IDWH as 50 (pixels) at the first time point according to the timing, the processor PR records 50 as the tire inner diameter of the tire image WH. Then, the processor PR obtains the tire inner diameter IDWH as 60 at the second time point after the first time point, in response to 60 being greater than 50, the processor PR updates the record of the tire inner diameter of the tire image WH from 50 to 60. Afterward, the processor PR obtains the tire inner diameter IDWH as 45 at the third time point after the second time point, in response to 45 being not greater than 60, the processor PR does not update the record of the tire inner diameter of the tire image WH, and the record of the tire inner diameter of the tire image WH is still maintained at 60. Therefore, the storage space may be saved, and the tire inner diameter of the tire image WH with the maximum value may be found in the video.

In step 240, the classification model SM outputs the tire size according to the tire inner diameter.

Figure 8:
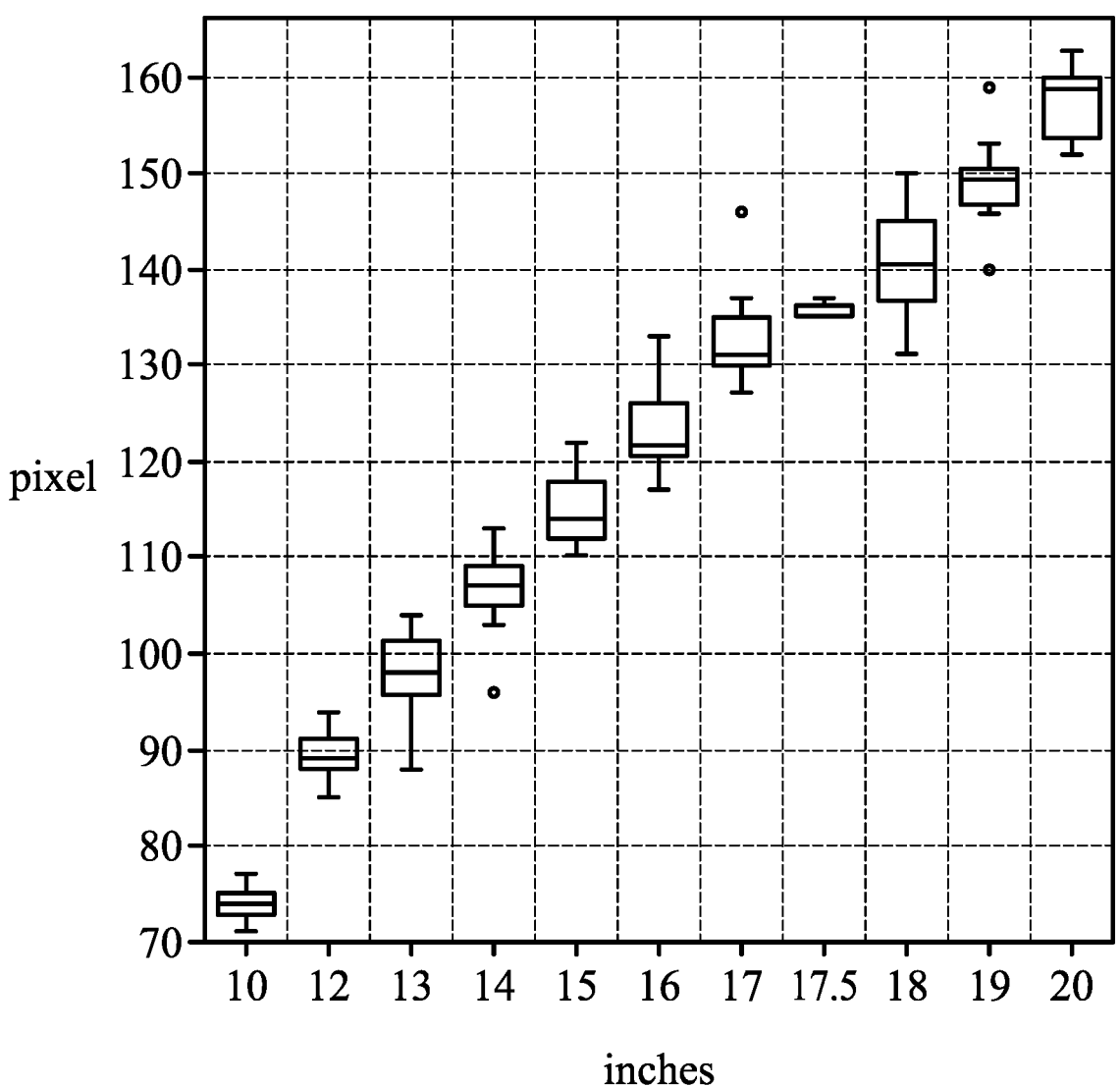
FIG. 8 is a schematic view of tire size statistics according to an embodiment of the present invention.

FIG. 8 is a schematic view of tire size statistics according to an embodiment of the present invention. FIG. 8 shows the pixel values measured by putting a plurality of tires with known actual size, and draws it as a box-and-whisker plot, wherein the unit of the horizontal axis is inches, and the unit of the vertical axis is pixels.

It can be seen from FIG. 8 that the measured pixel value corresponding to the actual size has the distinguishing ability (i.e., the pixel value may correspond to the size of the tire). However, two different sizes still have the possibility of corresponding to the same pixel value. For example, when the estimated pixel value of the tire inner diameter is 120, it seems that it may be classified as 15 inches or 16 inches. Therefore, in order to achieve the minimum error, the classification model may be established in this step, so as to automatically classify through the data learning. The classification model is, for example, a deep neural network (DNN), a support vector machine (SVM), Random forests, etc., but is not limited to one of the models.

In an embodiment, the input of the classification model SM during training is the maximum tire inner diameter value of the tire, and the goal during the training process is to output the tire-size category to which the maximum tire inner diameter value of the each of the tire belongs.

In an embodiment, the position of the tire on the conveyor belt 30 is also important factor affecting the pixel value due to the distance of lens. Therefore, adding the position of the tire on the conveyor belt 30 as a parameter into the classification model may also increase the identification accuracy of the model.

In an embodiment, after inputting the inner diameter pixel value of the tire inner diameter into the classification model SM, the classification model SM outputs probability corresponding to each of a plurality of candidate tire-size categories, and uses a tire-size category corresponding to a highest probability of the probabilities as the tire size. In an embodiment, the processor PR timely superimposes obtained information about the tire size on the original video, and transmits a video superimposed with information about the tire size to the display device for display, so that the user may check the tire size through the display device.

In an embodiment, the processor PR is used to count the tires with the same tire size according to the tire size of each tire (for example, the current quantities CT1~CT4 of the same size are marked in FIG. 5, and the tire inner diameter, the tire outer diameter and/or the current quantity of the same size of the framed tire image may be displayed together in FIG. 5).

In an embodiment, the processor PR may output the final statistical results, for example, there are 10 tires with a size of 15 inches, there are 8 tires with a size of 16 inches, etc.

In summary, the tire-size identification method, the tire-size identification system and the computer-readable storage medium find the tire inner diameter through the object-detection model, the image-segmentation model, the tracking algorithm and the classification model, and the size of the tire may be obtained through the classification model according to the tire inner diameter, thereby achieving a more accurate effect of detecting the tire inner diameter.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tire-size identification method, comprising:
inputting an image into an object-detection model, wherein the object-detection model frames a tire image in the image to generate a framed tire image;
inputting the framed tire image into an image-segmentation model, wherein the image-segmentation model outputs a tire inner diameter of the framed tire image;
inputting the tire inner diameter into a classification model, wherein the classification model outputs a tire size according to an inner diameter pixel value of the tire inner diameter for classifying; and
after inputting the inner diameter pixel value of the tire inner diameter into the classification model, the classification model outputting a probability corresponding to each of a plurality of candidate tire-size categories, and using a tire-size category corresponding to a highest probability of the probabilities as the tire size.

2. The tire-size identification method as claimed in claim 1, further comprising:

using a processor to calculate a distance between the framed tire image in the image and the framed tire image in a next frame image, and to compare the framed tire image in the image and the framed tire image in the next frame image with a shortest distance between the image and the next frame image, so as to track a position of the framed tire image.

3. The tire-size identification method as claimed in claim 2, further comprising:
using the processor to find a maximum value of the tire inner diameter from an original video;
using a storage device to record the maximum value of the tire inner diameter in the original video;
wherein the original video comprises the image and the next frame image.

4. The tire-size identification method as claimed in claim 1, further comprising:
using a processor to count tires with the same tire size according to the tire size of each tire.

5. The tire-size identification method as claimed in claim 1, further comprising:
superimposing obtained information about the tire size on an original video, and transmitting a video superimposed with information about the tire size to a display device for display.

6. The tire-size identification method as claimed in claim 1, further comprising:
obtaining the image, wherein the image is a region-of-interest image.

7. A tire-size identification system, comprising:
a processor; and
a storage device, wherein the processor accesses a program stored in the storage device to implement an object-detection model, an image-segmentation model and a classification model;
wherein the object-detection model frames a tire image in an image to generate a framed tire image;
wherein the image-segmentation model outputs a tire inner diameter of the framed tire image;
wherein the classification model outputs a tire size according to an inner diameter pixel value of the tire inner diameter for classifying; and
wherein after the processor inputs the inner diameter pixel value of the tire inner diameter into the classification model, the classification model outputs a probability corresponding to each of a plurality of candidate tire-size categories and uses a tire-size category corresponding to a highest probability of the probabilities as the tire size.

8. The tire-size identification system as claimed in claim 7, wherein the processor calculates a distance between the framed tire image in the image and the framed tire image in a next frame image, and compares the framed tire image in the image and the framed tire image in the next frame image with a shortest distance between the image and the next frame image, so as to track a position of the framed tire image.

9. The tire-size identification system as claimed in claim 8, wherein the processor finds a maximum value of the tire inner diameter from an original video, and the storage device records the maximum value of the tire inner diameter in the original video;
wherein the original video comprises the image and the next frame image.

10. The tire-size identification system as claimed in claim 7, wherein the processor counts tires with the same tire size according to the tire size of each tire.

11. The tire-size identification system as claimed in claim 7, wherein the processor superimposes obtained information about the tire size on an original video, and transmits a video superimposed with information about the tire size to a display device for display.

12. The tire-size identification system as claimed in claim 7, wherein the processor further obtains the image, wherein the image is a region-of-interest image.

13. A non-transitory computer-readable storage medium that stores one or more programs comprising instructions that, when executed by a processor, cause the processor to perform the following steps:

inputting an image into an object-detection model, wherein the object-detection model frames a tire image in the image to generate a framed tire image;

inputting the framed tire image into an image-segmentation model, wherein the image-segmentation model outputs a tire inner diameter of the framed tire image;

inputting the tire inner diameter into a classification model, wherein the classification model outputs a tire size according to an inner diameter pixel value of the tire inner diameter for classifying; and after inputting the inner diameter pixel value of the tire inner diameter into the classification model, the classification model outputting a probability corresponding to each of a plurality of candidate tire-size categories, and using a tire-size category corresponding to a highest probability of the probabilities as the tire size.

14. The non-transitory computer-readable storage medium as claimed in claim 13, wherein when the instructions are executed by the processor, the processor is caused to further perform the following steps:

calculating a distance between the framed tire image in the image and the framed tire image in a next frame image, and comparing the framed tire image in the image and the framed tire image in the next frame image with a shortest distance between the image and the next frame image, so as to track a position of the framed tire image.

15. The non-transitory computer-readable storage medium as claimed in claim 14, wherein when the instructions are executed by the processor, the processor is caused to further perform the following steps:

finding a maximum value of the tire inner diameter from an original video;

recording the maximum value of the tire inner diameter in the original video;

wherein the original video comprises the image and the next frame image.

16. The non-transitory computer-readable storage medium as claimed in claim 13, wherein when the instructions are executed by the processor, the processor is caused to further perform the following steps:

counting tires with the same tire size according to the tire size of each tire.

17. The non-transitory computer-readable storage medium as claimed in claim 13, wherein when the instructions are executed by the processor, the processor is caused to further perform the following steps:

superimposing obtained information about the tire size on an original video, and transmitting a video superimposed with information about the tire size to a display device for display.

* * * * *